US011970638B2

(12) United States Patent
True et al.

(10) Patent No.: US 11,970,638 B2
(45) Date of Patent: Apr. 30, 2024

(54) MOISTURE-CURABLE ONE-PACK COMPOSITION AND METHOD FOR JOINING, CASTING AND COATING USING THE COMPOSITION

(71) Applicant: DELO INDUSTRIE KLEBSTOFFE GMBH & CO. KGAA, Windach (DE)

(72) Inventors: Markus True, Windach (DE); Markus Ehret, Windach (DE); Bastian Sü-Veges, Windach (DE)

(73) Assignee: DELO INDUSTRIE KLEBSTOFFE GMBH & CO. KGAA, Windach (DE)

( * ) Notice: Subject to any disclaimer, the term of this patent is extended or adjusted under 35 U.S.C. 154(b) by 586 days.

(21) Appl. No.: 17/278,991

(22) PCT Filed: Oct. 29, 2019

(86) PCT No.: PCT/EP2019/079472
§ 371 (c)(1),
(2) Date: Mar. 23, 2021

(87) PCT Pub. No.: WO2020/094453
PCT Pub. Date: May 14, 2020

(65) Prior Publication Data
US 2022/0033697 A1 Feb. 3, 2022

(30) Foreign Application Priority Data

Nov. 8, 2018 (DE) .................. 10 2018 127 854.3

(51) Int. Cl.
| | | |
|---|---|---|
| C08F 2/46 | (2006.01) | |
| C08F 2/50 | (2006.01) | |
| C08G 61/04 | (2006.01) | |
| C08G 65/336 | (2006.01) | |
| C08G 77/08 | (2006.01) | |
| C08G 77/18 | (2006.01) | |
| C08K 5/053 | (2006.01) | |
| C08K 5/07 | (2006.01) | |
| C08K 5/09 | (2006.01) | |
| C08K 5/5397 | (2006.01) | |
| C09J 183/06 | (2006.01) | |

(52) U.S. Cl.
CPC .......... *C09J 183/06* (2013.01); *C08G 65/336* (2013.01); *C08G 77/08* (2013.01); *C08G 77/18* (2013.01); *C08K 5/053* (2013.01); *C08K 5/07* (2013.01); *C08K 5/09* (2013.01); *C08K 5/5397* (2013.01); *C08G 2170/00* (2013.01); *C08G 2190/00* (2013.01)

(58) Field of Classification Search
CPC ........ C08K 5/09; C08K 5/5397; C08K 5/053; C08K 5/07; C08G 75/045; C08G 77/18; C08G 77/08; C08G 65/336; C08G 2190/00; C09J 183/06; C09J 183/04

USPC ................. 522/64, 6, 189, 184, 71, 1; 520/1
See application file for complete search history.

(56) References Cited

U.S. PATENT DOCUMENTS

| | | | |
|---|---|---|---|
| 3,979,344 A | 9/1976 | Bryant et al. | |
| 5,364,955 A | 11/1994 | Zwiener et al. | |
| 6,306,555 B1 | 10/2001 | Schulz et al. | |
| 2008/0152926 A1 | 6/2008 | Baikerikar et al. | |
| 2012/0088188 A1 | 4/2012 | Trefonas et al. | |
| 2015/0376476 A1 | 12/2015 | Rahim et al. | |
| 2019/0062606 A1 | 2/2019 | Schuh et al. | |
| 2023/0331890 A1* | 10/2023 | Kirsankina | ........... B29B 7/7461 |

FOREIGN PATENT DOCUMENTS

| | | | | |
|---|---|---|---|---|
| CN | 101910295 A | | 12/2010 | |
| CN | 102540704 A | | 7/2012 | |
| CN | 101405360 | * | 11/2020 | |
| DE | 3702999 | | 8/1988 | |
| DE | 102007017842 A1 | | 10/2008 | |
| DE | 102011002440 A1 | | 7/2012 | |
| DE | 102015222028 A1 | | 5/2017 | |
| DE | 102016111590 A1 | * | 12/2017 | ............. C08G 77/06 |
| DE | 102016111590 A1 | | 12/2017 | |
| EP | 1124832 A1 | | 8/2001 | |
| EP | 1421129 | | 5/2004 | |

(Continued)

OTHER PUBLICATIONS

Krapp et al, CN 101405360 Machine Translation, Nov. 17, 2010 (Year: 2010).*

(Continued)

*Primary Examiner* — Jessica Whiteley

(74) *Attorney, Agent, or Firm* — McNees Wallace & Nurick LLC

(57) ABSTRACT

A composition that can be activated by irradiation and cured by moisture comprises (A) one or more moisture-curable compounds from the group of alkoxy silanes, (B) at least one acid generator releasing an acid when exposed to actinic radiation, and (C) at least one carbonyl compound and/or carbonyl derivative selected from the group of aldehydes, ketones, hemiacetals and hemiketals. Moreover, the compositions according to the present invention can additionally contain an alcohol and/or thiol (D), a catalyst for moisture-curing (E), a radiation-curable compound (F), a photoinitiator for radical polymerization (G), and further additives (H). After activation of the acid generator the composition cures even in high layer thicknesses independently of the ingress of external moisture.

Furthermore, a method for the bonding, molding, sealing and coating of substrates using the composition is described.

22 Claims, No Drawings

(56) References Cited

FOREIGN PATENT DOCUMENTS

| | | |
|---|---|---|
| EP | 1591464 A1 | 11/2005 |
| EP | 2207851 A2 | 7/2010 |
| EP | 2170986 B1 | 6/2011 |
| EP | 2545133 B1 | 4/2014 |
| EP | 2344107 B1 | 2/2017 |
| EP | 3184569 A1 | 6/2017 |
| WO | 1998002493 A1 | 1/1998 |
| WO | 2003008404 | 1/2003 |
| WO | 2003014226 A1 | 2/2003 |
| WO | 2003072567 A1 | 9/2003 |
| WO | 2004104113 A1 | 12/2004 |
| WO | 2009058545 A2 | 5/2010 |
| WO | 2013083505 A1 | 6/2013 |
| WO | 2017035551 A1 | 3/2017 |
| WO | 2018119067 A1 | 6/2018 |

OTHER PUBLICATIONS

True et al, DE 102016111590 Machine Translation, Dec. 28, 2017 (Year: 2017).*

* cited by examiner

MOISTURE-CURABLE ONE-PACK COMPOSITION AND METHOD FOR JOINING, CASTING AND COATING USING THE COMPOSITION

FIELD OF THE INVENTION

The present invention relates to one-pack compositions that are curable by moisture when activated by radiation, and the use thereof for the bonding, molding, sealing and coating of substrates.

In addition, the invention relates to a method for the joining, coating, molding or casting of substrates using the composition.

TECHNICAL BACKGROUND

One-pack compositions that can be crosslinked by actinic radiation and moisture are known from EP 2 545 133 B1. Apart from silane-based moisture-curable compounds, they additionally contain radically radiation-curable compounds, and are particularly suitable for the filling of electro-optical parts.

Silane-based, moisture-curable, one-pack compositions, the moisture-curing of which can be induced by irradiation or heat, are known, for example, from DE 10 2016 111 590 A1. The silane-based compositions contain a photolatent and/or heat-latent acid generator. Following activation of the acid generator, and without the ingress of additional moisture, the compositions remain liquid for a period of at least 24 hours. During use, in spite of fast initial strengths, more time is required for the compositions until complete curing, in particular with higher layer thicknesses, as the ingress of moisture occurs in a diffusion-controlled manner.

U.S. Pat. No. 3,979,344 A and EP 1 591 464 A1 describe the catalysis of silane crosslinking by means of metal-containing catalysts such as dibutyltin laurate (DBTL) or aminosilanes. Although these compounds catalyze silane crosslinking, the water content for the crosslinking reactions remains the limiting factor. In particular with high layer thicknesses or part geometries which additionally impede the ingress of moisture, several days to weeks may elapse until curing of the silane-containing compositions is complete. Moreover, from an ecological point of view, the use of metal-containing tin-based catalysts is problematic.

One approach to provide a moisture-crosslinking polymer system with a water donation system is known from DE 10 2011 002 440 A1. Here, water is released from the reaction of a cyclic carboxylic acid anhydride with a primary amine at elevated temperatures. However, the disclosure provides that the composition is thermoplastically processed at temperatures far above 100° C.

EP 2 170 986 B1 describes a method for the release of water for moisture-crosslinking polyolefins by ring-closing dehydration reactions. As a water donator, for example, amino acids or dicarboxylic acids releasing water under ring closure conditions are used. A disadvantage of this approach is that the use of a metal-containing catalyst is absolutely essential.

WO 2009 058 545 A2 discloses a composition and a method for the in-situ generation of water from vicinal diols by an elimination reaction. Optionally, the compositions contain an acid to additionally catalyze the release of water. Again, elevated temperatures and melt processing of the composition are provided.

A disadvantage of all the approaches described is, that heat is required as a signal for water release. The temperatures are so high that sensitive parts can be damaged even after short contact with the composition. Most of the water release methods described require processing of the curable composition under injection molding conditions. Moreover, from an ecological point of view, the high amounts of energy required are a disadvantage.

SUMMARY OF THE INVENTION

It is an object of the invention to avoid the disadvantages of the compositions known from the state of the art, and to provide storage-stable one-pack compositions that can be cured by moisture when radiation-activated and are based on moisture-curable compounds releasing water when cured, and thus reliably cure within a short time even in high layer thicknesses. The curing speed of the compositions is largely independent of the external ingress of moisture.

Preferably, the release of water should occur under mild conditions without undue input of heat.

According to the present invention, these objects are achieved by a moisture-curable one-pack composition according to claim 1.

Advantageous embodiments of the compositions according to the present invention are stated in the sub-claims, which can optionally be combined with each other.

Moreover, another object of the invention is the use of the compositions according to the present invention as an adhesive or sealant for the bonding, casting, molding, sealing and coating of substrates.

Further, the invention relates to a method for the bonding, casting, molding, sealing and coating of substrates using the compositions according to the present invention. In particular, the compositions can be activated by irradiation in a flow apparatus.

The composition according to the present invention comprises (A) one or more moisture-curable compounds selected from the group of alkoxysilanes, (B) at least one acid generator releasing an acid when exposed to actinic radiation, and (C) at least one carbonyl compound or carbonyl derivative selected from the group of aldehydes, ketones, hemiacetals and/or hemiketals.

Moreover, the compositions according to the present invention can additionally contain an alcohol and/or a thiol (D), a catalyst for moisture-curing (E), a radiation-curable compound (F), a photoinitiator for radical polymerization (G), and further additives (H).

DESCRIPTION OF PREFERRED EMBODIMENTS

The invention is described in the following in detail and by way of example using preferred embodiments, which, however, are not to be construed as limiting.

In the sense of the invention, "one-pack" or "one-pack composition" means that the components mentioned are present together in the composition.

In the sense of the invention, "liquid" means that, at 23° C., the loss modulus G" determined by measuring the viscosity is larger than the storage modulus G' of the respective composition.

The compositions are considered as processable if the viscosity of the respective composition changes by less than 100%, preferably by less than 50%, during storage at room temperature over a period of 7 days.

As far as the indefinite article "a" or "an" is used, this also comprises the plural form "one or more" unless explicitly excluded.

"At least bifunctional" means that, per molecule, two or more units of the respective functional group named are contained.

All weight proportions set out below relate to the total weight of the composition made of components (A) to (H) if not stated otherwise.

The compositions according to the present invention are liquid at room temperature and curable by moisture when activated by radiation without the need of external moisture ingress. The compositions can be activated by irradiation with actinic radiation such that an amount of water sufficient for moisture-curing is released in the composition itself. The release of water occurs only in areas accessible to irradiation.

In a first preferred embodiment, the compositions contain at least one moisture-curable compound (A) based on an at least bifunctional alkoxysilane compound (A1). Apart from that, the compositions contain at least one photolatent acid (B), at least one carbonyl compound or carbonyl derivative (C) selected from the group of aldehydes, ketones, hemiacetals and/or hemiketals, and optionally at least one alcohol and/or thiol (D). The composition of the first preferred embodiment does not contain any further of the catalysts commonly used in moisture-curing of alkoxy silanes such as aminosilanes, tin compounds or organic acids.

In a second preferred embodiment, the compositions additionally contain, apart from the components of the first embodiment, at least one catalyst (E) for moisture-curing of the alkoxy silanes. Thus, the composition can reliably cure even in areas which cannot be irradiated with actinic radiation but can be accessed by external moisture.

In a third preferred embodiment, the compositions additionally contain, apart from the components of the first and/or second embodiment, at least one radically curable compound (F) based on (meth)acrylates, and a radical photoinitiator (G).

In all embodiments named, the compositions can additionally contain further additives (H) known to those skilled in the art of moisture-curable compositions.

Below, the components of the compositions according to the present invention are described in detail. The respective components can be combined with each other, within the same or different groups, in any technically appropriate manner in the sense of the invention.

Component (A): Moisture-Curable Compounds
(A1): Bifunctional Alkoxy Silane Compound The moisture-curable compound of component (A) comprises one or more at least bifunctional alkoxy silane compounds (A1).

The at least bifunctional alkoxy silane compound with at least two alkoxy silane groups (A1) preferably corresponds to the general formula (I):

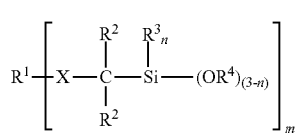

Formula (I)

in which $R^1$ is an at least divalent organic residue, each $R^2$ is independently a monovalent residue selected from the group consisting of hydrogen, linear, branched, cyclic, saturated, unsaturated and aromatic hydrocarbons that can be halogen-substituted and/or interrupted by 1 to 3 heteroatoms, where appropriate, each $R^3$ is independently a monovalent residue selected from the group of linear, branched, cyclic, saturated, unsaturated and aromatic hydrocarbons, and can be halogen-substituted or interrupted by 1 to 3 heteroatoms where appropriate, each $R^4$ is independently a monovalent residue selected from the group consisting of hydrogen, linear, branched, cyclic, saturated, unsaturated and aromatic hydrocarbons that can be optionally halogen-substituted or interrupted by 1 to 3 heteroatoms, X is a di- or trivalent residue containing heteroatoms that is bound to the $-CR^2{}_2-SiR^3{}_n(OR^4)_{(3-n)}$ group by a heteroatom, in particular oxygen, nitrogen or sulfur, m is at least 2, preferably 2 to 9, more preferably 2 to 4; and n=0 to 2.

The compounds of general formula (I) are so-called α-(alkoxy) silane compounds characterized in that the (alkoxy) silane groups are contained in an α-position to a hetero-atom such as oxygen, sulfur or nitrogen. The alkoxy silane group is separated from the heteroatom by a substituted or unsubstituted methylene group.

According to a preferred embodiment, $R^1$ is a residue selected from the group consisting of (i) linear or branched, saturated or unsaturated alkyl residues with 1 to 8 C-atoms that can be interrupted by 1 to 3 heteroatoms, where appropriate, (ii) saturated or unsaturated cycloalkyl residues with 3 to 9 C-atoms that can be interrupted by 1 to 3 heteroatoms, where appropriate, (iii) aromatic residues with 5 to 10 C-atoms, or (iv) polyolefins, polyethers, polyamides, polyesters, polycarbonates, polyurethanes, polyureas, polybutadienes, hydrogenated polybutadienes, polysiloxanes or polyacrylates, wherein $R^1$ can be unsubstituted or carry further substituents.

More preferably, $R^1$ is a polymeric residue of the above-mentioned group (iv), preferably with terminal alkoxy silane groups according to formula (I).

Particularly preferably, the residue $R^1$ is a polymer backbone or copolymer backbone based on a polyether, polyester, polycarbonate, polyurethane, polyamide or polyurea, and is more preferably a polyurethane or polyether residue.

Residue X containing the heteroatom is preferably a hetero-atom containing a divalent residue such as $-O-$, $-S-$, $-N(R)-$, $-C(O)-O-$, $-O-C(O)-O-$, $-O-C(O)-O-N(R)-$, $-N(R)-C(O)-O-$, $-S(O)-$, $-S(O)_2-$, $-S(O)-O-$, $-S(O)_2-O-$, $-O-S(O)_2-O-$, $-C(O)-N(R)-$, $-S(O)_2-N(R)-$, $-S(O)_2-N[C(O)R]-$, $-O-S(O)_2-N(R)-$, $-N(R)-S(O)_2-O-$, $-P(O)(OR)-O-$, $-O-P(O)(OR)-$, $-O-P(O)(OR)-O-$, $-P(O)(OR)-N(R)-$, $-N(R)-P(O)(OR)-$, $-O-P(O)(OR)-N(R)-$, $-N(R)-P(O)(OR)-O-$, $-N[C(O)R]-$, $-N=C(R)-O-$, $-C(R)=N-O-$, $-C(O)-N[C(O)R]-$, $-N[S(O)_2R']-$, $-C(O)-N[S(O)_2R']-$ or $-N[P(O)R''_2]-$, wherein R is hydrogen or a $C_1$-$C_{20}$ alkyl or $C_6$-$C_{20}$ aryl residue that can be substituted where appropriate, R' is a $C_1$-$C_{20}$ alkyl or $C_6$-$C_{20}$ aryl residue that can be substituted where appropriate, and R" is a $C_1$-$C_{20}$ alkyl, $C_6$-$C_{20}$ aryl, $C_1$-$C_{20}$ alkoxy or $C_6$-$C_{20}$ aryloxy residue that can be substituted where appropriate.

In general formula (I), X is particularly preferably an oxygen or nitrogen atom or a carboxy, carbamate, carbonate, ureido, urethane or sulfonate bond.

$R^2$ is preferably hydrogen. $R^3$ is preferably $C_1$-$C_6$ alkyl, in particular methyl or ethyl, or phenyl.

In formula (I), the residue $R^4$ is preferably a methyl or ethyl group. Preferably, n=0 or 1. Furthermore, two residues $R^4$ can be bridged to form a cycle.

According to another preferred embodiment, the residue $R^2$ is hydrogen, $R^3$ and $R^4$ are methyl groups, and n=1.

Preferably, the at least bifunctional α-alkoxy silane compounds have a mean molecular weight from 2,000 to 50,000 g/mol, particularly preferably from approx. 10,000 to 20,000 g/mol.

The production of α-alkoxy silane terminated compounds is, for example, described in detail in WO 03/014226 A1. Besides, many of the preferred α-silanes based on polyethers or polyurethanes are commercially available from Wacker Chemie AG. They are commercially sold under the trade name GENIOSIL STP-E. Examples are the STP-E10, STP-E30 types.

In another embodiment, component (A1) can also comprise, optionally in addition to or instead of the silane compound of formula (I) having at least two α-alkoxy silane groups, one or more at least bifunctional alkoxy silane compounds of the general formula (II):

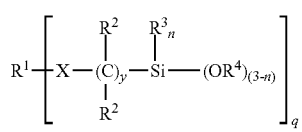

Formula (II)

wherein $R^1$, $R^2$, $R^3$ and $R^4$ have the meanings given above for formula (I);

X is a di- or trivalent residue containing heteroatoms that is bound to the $-CR^2{}_2-SiR^3{}_n(OR^4)_{(3-n)}$ group by a hetero atom, in particular oxygen, nitrogen or sulfur, n=0 to 2, q is at least 2, preferably 2 to 9, more preferably 2 to 4; and y is a number from 2 to 6.

In the preferred compounds of general formula (II), y=3. These compounds are so-called γ-alkoxy silanes in which the hetero atom of the residue X is separated from the silicon atom of the alkoxy silane group by an optionally substituted propylene unit.

The production of γ-alkoxy silanes is, for example, described in detail in U.S. Pat. No. 5,364,955 A and the documents mentioned therein. γ-alkoxy silanes of the general formula (II) with at least two alkoxy silane containing terminal groups are commercially available from Wacker Chemie AG. Such γ-silane terminated polyethers are available under the labels Geniosil STP-E15 and STP-E35.

Component (A1) can be composed of one or more compounds of general formulas (I) and/or (II).

Component (A2): Monofunctional Silane Compound

Apart from component (A1), the compositions according to the present invention can additionally contain at least one monofunctional silane compound (A2) having only one alkoxy silane group, and/or derivatives thereof. In particular, component (A2) can comprise partially fused or bridged, especially cyclically bridged, derivatives of the monofunctional silane compound that can be obtained by partial hydrolysis of the alkoxy silane groups or by reaction of the alkoxy silane groups with divalent alcohols.

Preferably, component (A2) comprises compounds of the general formula (III):

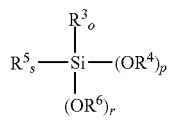

Formula (III)

wherein $R^3$ and $R^4$ have the meanings given in relation to formula (I);

$R^5$ is independently a monovalent organic residue that is selected from the group of linear, branched, cyclic, saturated, unsaturated and aromatic hydrocarbons, and can be optionally substituted by heteroatoms or interrupted by hetero atoms and is different from $R^3$;

$R^6$ is a Si residue with which further residues according to formula (III) can be linked, is an integer from 0 to 3, p is an integer from 1 to 3, s is an integer from 0 to 3, and r is an integer from 0 to 2, where the sum of o+p+r+s=4.

Preferably, o is 0 or 1, p is 2 or 3, s is 1, and r is 0 or 1.

Partially fused or bridged silane compounds of formula (III) are also comprised.

The monofunctional silane compound of component (A2) protects the compositions according to the present invention from penetrating moisture during production and storage, and also contributes to the build-up of adhesion in the curing of the compositions.

Apart from classical alkoxy vinyl silanes, various monofunctional, preferably monomeric, α- or γ-alkoxy silanes can be used as component (A2).

Preferred examples from the group of α-silanes comprise (methacryloxymethyl)methyldimethoxysilane, methacryloxymethyltrimethoxy-silane, N-trimethoxysilylmethyl-O-methylcarbamate and N-dimethoxy(methyl)silyl-methyl-O-methylcarbamate.

Examples of commercially available monofunctional α-alkoxy silanes are products of Wacker Chemie AG. Corresponding methacrylate- or carbamate-functionalized α-alkoxy silanes are available under the labels GENIOSIL XL 32, XL 33, XL 63 or XL 65.

Partially fused monofunctional silanes can also be used as moisture scavengers. To this end, monofunctional silanes such as Geniosil XL10 (VTMO) are reacted with a defined amount of water. Such products are, for example, commercially available under the label Dynasylan 6490 from Evonik Industries AG.

Alkoxy silanes that are optionally cyclically bridged with bifunctional alcohols can also be used as component (A2). Such products are commercially available under the label Silquest Y-15866 from Momentive.

Moreover, as component (A2), the use of silanes which can fulfill a multifunction as a moisture scavenger and adhesion promoter is preferred.

A combination of various different silanes according to general formula (III) and their partially fused or bridged derivatives is also in the sense of the invention.

However, the use of silanes that act in the presence of moisture as crosslinking catalysts and thus catalyze curing of the composition is not preferred. Especially aminosilanes as they are described, for example, in EP 1 421 129 A belong to this group. Examples are γ-aminopropyltrimethoxysilane or N-aminoethyl-3-aminopropyltrimethoxysilane. Thus, the composition according to the present invention is preferably free of aminosilanes.

Apart from compounds (A1) and (A2), poly(organo) siloxanes with curable alkoxy silane groups and/or curable acetyl groups (A3) can also be used in the moisture-curing component (A). They are not further restricted in terms of their chemical structure, and comprise, for example, cyclic polysiloxanes, linear polysiloxanes, crosslinked and branched polysiloxanes.

In the compositions according to the present invention, component (A) is preferably present in a range from 5 to 99.5 wt-%, more preferably from 10 to 99 wt-% and particularly preferably from 20 to 98 wt-%, based on the total weight of the composition made of components (A) to (H).

Component (B): Acid Generator

Apart from the moisture-curable compounds of component (A), the compositions according to the present invention additionally contain at least one acid generator (B). The acid generator preferably comprises compounds that are capable of releasing a strong acid when exposed to actinic radiation. In the following, such compounds are also referred to as photolatent acids. The released acid catalyzes the hydrolysis and crosslinking of the moisture-curing groups contained in the composition. Apart from that, the released acid also catalyzes the formation of acetals/ketals, thioacetals and/or thioketals by a reaction of component (C) with alcohols or thiols contained in the formulation and/or released by hydrolysis from the moisture-curable compounds of component (A). By reaction of component (C) to form acetals or ketals, water is released in the composition which, in turn, is available for moisture-curing of component (A). This means that curing within a short period of time, also of high layer thicknesses, is possible. Water release occurs only in areas accessible to irradiation.

Suitable photolatent acids are, for example, known from cationically polymerizable systems. Thus, aromatic aryl sulfonium salts as they are described in WO 2003/072567 A1 or WO 2003/008404 A1 or aryl iodonium salts as they are described in WO 1998/002493 A1 or U.S. Pat. No. 6,306,555 A can be used.

In addition, onium salts suitable as photolatent acids are described by J. V. Crivello and K. Dietliker in "Photoinitiators for Free Radical, Cationic & Anionic Photopolymerisation", volume III of "Chemistry & Technology of UV & EB Formulation for Coatings, Inks & Paints", 2$^{nd}$ edition, J. Wiley and Sons/SITA Technology (London), 1998.

Examples of different anions of the sulfonium or iodonium salts are $HSO_4^-$, $PF_6^-$, $SbF_6^-$, $AsF_6^-$, $Cl^-$, $Br^-$, $I^-$, $ClO_4^-$, $PO_4^-$, $SO_3CF_3^-$, tosylate or a borate anion such as $BF_4^-$ and $B(C_6F_5)_4^-$.

Photolatent acids based on aluminate anions as they are disclosed in EP 3 184 569A1 or WO 2017 035551 A1 are also suitable.

Photoinitiators on the basis of friaryl sulfonium commercially available as photolatent acids are available under the labels Chivacure 1176 from Chitech, Irgacure PAG 290 from BASF or UVI-6976 and UVI-6974 from Dow Chemical Co.

Photoinitiators on the basis of diaryl iodonium commercially available as photolatent acids are, for example, available under the trade names UV1242 or UV2257 from Deuteron and Bluesil 2074 from Bluestar.

Apart from photolatent acids on the basis of iodonium and sulfonium ions, non-ionic photolatent acids can also be used in the compositions according to the present invention. Such compounds on the basis of oxime esters and oxime sulfonic acid esters are described in WO 2013/083505 A1 and EP 1 124 832 A1. Commercially available non-ionic photolatent acids on the basis of oxime sulfonic acid esters are, for example, available under the labels Irgacure PAG 103, Irgacure PAG 121, Irgacure PAG 203 and CGI 1907 from BASF.

In addition, as component (B), trichloromethyl triazine compounds or benzoin esters can also be used as non-ionic photolatent acids.

The photolatent acid used as an acid generator in the compositions according to the present invention can preferably be activated by actinic radiation of a wavelength from 200 to 480 nm, particularly preferably of a wavelength from 320 to 480 nm. If necessary, the photolatent acid can be combined with a suitable sensitizing agent.

The use of the described non-ionic photolatent acid as component (B) is particularly preferred in the present invention.

The above list is to be considered as exemplary for the acid generator (B) and not to be construed as limiting.

It has been shown that even very low concentrations of component (B) are sufficient to achieve an activation of the composition while water is released, and then complete curing. In consideration of the high costs of the corresponding acid generators, this is an additional advantage. Furthermore, even small amounts of released acid are sufficient to catalyze moisture-curing by crosslinking of component (A). Thus, further catalysts for moisture-curing are not absolutely necessary but can optionally be used as well.

In the moisture-curable compositions according to the present invention, the acid generator (B) is preferably present in a proportion of 0.0001 to 5 wt-%, but particularly preferably in proportions of at least 0.001 wt-%, and/or preferably at most 3 wt-%, more preferably at most 1 wt-% or at most 0.5 wt-%, and particularly preferably at most 0.3 wt-%, based on the total weight of the composition made of components (A) to (H).

The use of particularly low concentrations of the acid generator (B) is preferably possible, in particular, when non-ionic photoinitiators are used.

It is also possible to use more than one photolatent acid generator in the compositions according to the present invention.

Component (C): Carbonyl Compound

Apart from components (A) and (B), the compositions according to the present invention further contain, as component (C), at least one carbonyl compound or carbonyl derivative selected from the group of aldehydes, ketones, hemiacetals and/or hemiketals. They can release water in the presence of alcohols and/or thiols by means of acid catalysis.

According to a preferred embodiment, component (C) comprises at least one carbonyl compound from the group of aldehydes and ketones. The aldehydes and ketones according to the present invention are not further restricted in terms of their chemical structure and functionality. Aliphatic, cycloaliphatic, aromatic aldehydes or ketones carrying one or more carbonyl groups can be used.

Examples of suitable aldehydes comprise formaldehyde, acetaldehyde, propionaldehyde, butyraldehyde, valeraldehyde, capronaldehyde, enanthaldehyde, caprylaldehyde, decanal, 2-ethylhexanal, 2-methylpentanal, 3-formylpinan, glyoxal, glutaraldehyde, pivaldehyde, acroleine, furfural, benzaldehyde, anisaldehyde, cinnamaldehyde, citral, citronellal, cuminaldehyde, dimethyl benzaldehyde, veratraldehyde, farnesal, 3-(2-furyl)acroleine, α-hexyl cinnamaldehyde, hydroxy citronellal, methional, 5-methyl-2-phenyl-2-hexenal, piperonal, salicylaldehyde and safranal, and combinations thereof.

Examples of suitable ketones comprise acetone, diethyl ketone, cyclopentanone, cyclohexanone, 2-octanone, acetanisole, acetoin, acetophenone, acetovanillone, benzophenone, benzylidene acetone, 2-butanone, butyrophenone, camphor, 2-decanone, ethyl acetoacetate, ethyl pyruvate, ionone, isophorone, mesityl oxide and 2,3-pentandione, and combinations thereof.

The carbonyl compounds mentioned are often compounds such as used in the flavor and fragrance industry. They are thus characterized by high availability and often also low toxicity properties. In addition, they have pleasant olfactory properties.

The use of aldehydes in component (C) is particularly preferred, as they show a higher reactivity than ketones in acetal formation, and release water more quickly in the compositions according to the present invention. Thus, using aldehydes can substantially reduce the time needed for curing of the compositions according to the present invention. In particular, moisture-curable compositions can be provided that are completely cured in the irradiated areas after irradiation within 24 h, especially within at most six hours.

Apart from aldehydes and ketones, their derivatives in the form of partial reaction products with alcohols and/or thiols (hemiacetals or hemiketals) can also be used as component (C).

Examples of suitable hemiacetals and/or hemiketals of component (C) are carbohydrates, in particular sugars.

The combination of several carbonyl compounds (C) with each other or with hemiacetals and/or hemiketals is also in the sense of the invention.

To reduce the proportion of low molecular weight components in the compositions according to the present invention which can outgas from the compositions, the use of higher molecular weight carbonyl compounds can also be considered. For example, polymers carrying reactive aldehyde and/or ketone groups can be used.

Hybrid compounds having both silane functionalities and suitable carbonyl groups can also be used to reduce outgassing of component (C) from the compositions according to the present invention as they can be integrated in the silane network.

In the compositions according to the present invention, component (C) is preferably present in a range from 0.1 to 20 wt-%, more preferably from 0.3 to 15 wt-% and particularly preferably from 0.5 to 10 wt-%, based on the total weight of the composition made of components (A) to (H).

Component (D): Alcohol and/or Thiol

Apart from components (A) to (C), the compositions according to the present invention can optionally contain an alcohol and/or thiol. The presence of component (D) accelerates the release of water and thus additionally reduces the time needed for curing of the compositions after activation.

The alcohols or thiols usable in the compositions according to the present invention are not further restricted in terms of their chemical structure; they can be aliphatic, cycloaliphatic or aromatic.

The use of bifunctional aliphatic short-chain alcohols and/or thiols is particularly preferred. The use of 1,2- and 1,3-substituted di-alcohols that are able to form cyclic acetals is especially preferred. Particularly preferred are aliphatic alcohols with 1 to 12 C-atoms.

Examples of suitable alcohols and thiols comprise the following compounds: methanol, ethanol, propanol, isopropanol, ethylene glycol, 1,3 propanediol, 1,4-butanediol, 1,3-butanediol, 2-ethylhexanol, 2-ethyl-1,3-hexanediol, 1-octanol, glycerol, 1,2-ethylene glycol, 1-propanethiol, 2-propanethiol, thiophenol, ethanethiol, octanethiol, dodecanethiol, mercaptoethanol and ethanedithiol.

Higher molecular weight alcohols and/or thiols are also in the sense of the invention. For example, alcohols based on polycarbonates, polyesters or preferably polyethers can be used. They are commercially available under the trade names Synalox or Acclaim from Dow Chemical or Covestro. At the same time, such higher molecular weight alcohols can act as plasticizers in the formulation.

The combination of several thiols and/or alcohols is also in the sense of the invention.

Hybrid compounds having both silane functionalities and suitable alcohol and/or thiol groups can also be used to reduce outgassing of low molecular weight compounds from the compositions according to the present invention.

In the compositions according to the present invention, component (D) is preferably present in a range from 0 to 50 wt-%, more preferably from 0 to 30 wt-% and particularly preferably from 0 to 20 wt-% or from 0.1 to 20 wt-%, based on the total weight of the composition made of components (A) to (H).

Component (E): Catalyst

In the second preferred embodiment, the compositions according to the present invention additionally comprise at least one catalyst for silane crosslinking.

As a catalyst, organometallic compounds, for example on the basis of lead, iron, titanium, zinc, tin, bismuth, cobalt, zirconium, vanadium and nickel, can be used. In particular, compounds such as dibutyltin laurate, dibutyltin diacetate, dibutyltin oxide, tetrabutyl titanate, iron acetyl acetonate, cobalt naphthenate and lead dioctate are suitable.

It is also preferred to use acid catalysts such as carboxylic acids, phosphoric acids, boric acids and sulfonic acids as catalysts. Lewis acids such as trimethylsilyltrifluoromethane sulfonic acid or trimethylsilyl chloride can be used as well. (Meth)acrylic acid, maleic acid, acetic acid, toluene sulfonic acid, trifluoromethane sulfonic acid and itaconic acid are particularly suitable.

Moreover, polymeric compounds with respective acid groups are suitable as catalysts (E).

The acidity of the acid catalyst (E) is preferably weaker by at least three $pK_s$ units than the acidity of the acid that is formed from the acid generator (B) following irradiation.

Basic catalysts, for example based on amines, are less preferred as they scavenge the acid released from the photolatent acid (B) and can thus impede the release of water.

The above list is to be considered as exemplary rather than final. The use of several catalysts is also in the sense of the invention.

In the second embodiment of the compositions according to the present invention, preferably 0.01 to 20 weight percent, particularly preferably 0.1 to 5 weight percent, of component (E) is used, based here on the total weight of the composition made of components (A) to (H).

Component (F): Radiation-Curable Compound

In a third preferred embodiment, the compositions according to the present invention additionally comprise at least one radiation-curable compound (F), which is not further restricted in terms of its chemical basic structure (e.g. aromatic, aliphatic, cycloaliphatic). Preferably, the radiation-curable compound (F) comprises at least one (meth)acrylate.

Here and in the following, the term "(meth)acrylate" and synonymous terms mean derivatives of both acrylic acid and methacrylic acid, and mixtures thereof.

Suitable radiation-curable compounds (F) comprise, for example: isobornyl acrylate, stearyl acrylate, tetrahydrofurfuryl acrylate, cyclohexyl acrylate, 3,3,5-trimethylcyclohexanol acrylate, behenyl acrylate, 2-methoxyethyl acrylate and other mono- or poly-alkoxylated alkyl acrylates, isobutyl acrylate, isooctyl acrylate, lauryl acrylate, tridecyl acrylate, isostearyl acrylate, 2-(o-phenylphenoxy)ethyl acrylate, acryloylmorpholine, N,N-dimethyl acrylamide, 4-butanediol diacrylate, 1,6-hexanediol diacrylate, 1,10-decanediol diacrylate, tricyclodecane dimethanol diacrylate, dipropyleneglycol diacrylate, tripropyleneglycol diacrylate, polybutadiene diacrylate, cyclohexane dimethanol diacrylate, diurethane acrylates of monomeric, oligomeric or polymeric diols and polyols, trimethylolpropane triacrylate (TMPTA) and dipentaerythritol hexaacrylate (DPHA), and combinations thereof. Using acrylates of a higher functionality that are derived from multi-branched or dendrimeric alcohols is also advantageous.

The analogous methacrylates are also in the sense of the invention.

As component (F), urethane acrylates based on polyesters, polyethers, polycarbonate diols and/or (hydrogenated) polybutadiene diols can also be used as the radiation-curable compound of a higher molecular weight.

(Meth)acrylates with free acid groups can both act as radiation-curable component (F) in the compositions according to the present invention and catalyze silane crosslinking as an acid catalyst (E).

A combination of several radiation-curable compounds is also in the sense of the invention.

In the compositions according to the present invention of the third embodiment, the radiation-curable compound (F) is preferably present in a proportion of 3 to 80 weight percent, particularly preferably in a proportion of 5 to 50 weight percent, based on the total weight of the composition made of components (A) to (H).

Component (G): Radical Photoinitiator

Apart from the radiation-curable compound (F), the compositions of the third embodiment according to the present invention additionally contain a photoinitiator (G) to activate radical polymerization. As radical photoinitiators, the usual commercially available compounds such as α-hydroxyketones, benzophenone, α,α'-diethoxyacetophenone, 4,4-diethylaminobenzophenone, 2,2-dimethoxy-2-phenylacetophenone, 4-isopropylphenyl-2-hydroxy-2-propylketone, 1-hydroxycyclohexylphenylketone, isoamyl-p-dimethylaminobenzoate, methyl-4-dimethylaminobenzoate, methyl-o-benzoylbenzoate, benzoin, benzoin ethylether, benzoin isopropylether, benzoin isobutylether, 2-hydroxy-2-methyl-1-phenylpropane-1-one, 2-isopropyl-thioxanthone, dibenzosuberone, 2,4,6-trimethylbenzoyldiphenylphosphine oxide and bisacylphosphine oxides can be used, wherein the photoinitiators named can be used alone or in combination of two or more of the compounds mentioned.

For example, the IRGACURE™ types from BASF SE such as the IRGACURE 184, IRGACURE 500, IRGACURE 1179, IRGACURE 2959, IRGACURE 745, IRGACURE 651, IRGACURE 369, IRGACURE 907, IRGACURE 1300, IRGACURE 819, IRGACURE 819DW, IRGACURE 2022, IRGACURE 2100, IRGACURE 784, IRGACURE 250, IRGACURE TPO, IRGACURE TPO-L types can be used as UV photoinitiators. In addition, the DAROCUR™ types from BASF SE such as the DAROCUR MBF, DAROCUR 1173, DAROCUR TPO and DAROCUR 4265 types can be used.

The radical photoinitiator used as component (G) in the compositions according to the present invention can preferably be activated by actinic radiation of a wavelength from 200 to 600 nm, particularly preferably from 320 to 480 nm. If necessary, the photoinitiator can be combined with a suitable sensitizing agent.

In the compositions according to the present invention of the third embodiment, the photoinitiator (G) is preferably present in a proportion of 0.01 to 5 wt-%, based on the total weight of the composition made of components (A) to (H).

Component (H): Additives

The described compositions can also contain optional ingredients as additives (H). The additives (H) are preferably selected from the group of fillers, colorants, pigments, anti-ageing agents, fluorescent agents, stabilizers, accelerators, photosensitizers, adhesion promoters, moisture scavengers, crosslinking agents, flow improvers, wetting agents, thixotropic agents, diluents, flexibilizers, polymeric thickeners, flame retardants, corrosion inhibitors, plasticizers and tackifiers.

The above list of additives is to be construed as exemplary rather than limiting.

In the compositions according to the present invention, the additives of component (H) are preferably present in a proportion of 0 to 70 wt-%, based on the total weight of the composition made of components (A) to (H).

Formulation of the Compositions According to the Present Invention

The one-pack compositions according to the present invention preferably have the following compositions, each based on the total weight of components (A) to (H):

(A) at least one moisture-curable compound in a proportion of 10 to 99 wt-%, wherein the moisture-curable compound comprises at least one bifunctional alkoxy silane (A1) and optionally a monofunctional alkoxy silane (A2);

(B) at least one acid generator in a proportion of 0.0001 to 3 wt-%, preferably 0.001 to 1 wt-%;

(C) at least one carbonyl compound and/or carbonyl derivative in a proportion of 0.3 to 15 wt-%;

(D) at least one compound from the group of alcohols and/or thiols in a proportion of 0 to 30 wt-% or preferably 0.1 to 20 wt-%;

(E) at least one catalyst for silane crosslinking in a proportion of 0 to 20 wt-%, preferably 0.1 to 5 wt-%; more preferably in the form of an acid catalyst;

(F) at least one radiation-curable compound in a proportion of 0 to 50 wt-%, preferably 5 to 50 wt-%;

(G) at least one radical photoinitiator in a proportion of 0 to 5 wt-%, preferably 0.01 to 5 wt-%; and (H) at least one additive (H) in a proportion of 0 to 70 wt-%; preferably selected from the group of fillers, colorants, pigments, photosensitizers, anti-ageing agents, fluorescent agents, stabilizers, moisture scavengers, accelerators, adhesion promoters, crosslinking agents, flow improvers, wetting agents, thixotropic agents, diluents, flexibilizers, polymeric thickeners, flame retardants, corrosion inhibitors, plasticizers and tackifiers, alone or in combination with each other.

A formulation of the one-pack composition according to the present invention in a first preferred embodiment comprises the following components, each based on the total weight of components (A) to (H):

(A) 10 to 99 wt-% of the moisture-curable compound, wherein the moisture-curable compound comprises at least one bifunctional alkoxy silane (A1) and optionally a monofunctional alkoxy silane (A2);
(B) 0.0001 to 3 wt-%, preferably 0.001 to 1 wt-%, of the at least one acid generator (B);
(C) 0.3 to 15 wt-% of the at least one carbonyl compound (C);
(D) 0 to 30 wt-% of the at least one alcohol (D) or preferably 0.1 to 20 wt-%; and
(H) 0 to 70 wt-% of the at least one additive.

Preferably, the composition according to the present invention of the first embodiment is free of catalysts (E) for silane crosslinking and does not contain a radiation-curable compound (F) or a radical photoinitiator (G). Thus, the composition preferably consists of components (A), (B), (C) and optionally of at least one of the components (D) and (H).

A formulation of the one-pack composition according to the present invention in a second preferred embodiment comprises the following components, each based on the total weight of components (A) to (H):
(A) 10 to 99 wt-% of the moisture-curable compound (A), wherein the moisture-curable compound comprises at least one bifunctional alkoxy silane (A1) and optionally a monofunctional alkoxy silane (A2);
(B) 0.0001 to 3 wt-%, preferably 0.001 to 1 wt-% of the at least one acid generator (B);
(C) 0.3 to 15 wt-% of the at least one carbonyl compound (C);
(D) 0 to 30 wt-% of the at least one alcohol (D) or preferably 0.1 to 20 wt-%;
(E) 0.01 to 20 wt-% of the at least one catalyst (E), preferably an acid catalyst; and
(H) 0 to 70 wt-% of the at least one additive.

A formulation of the one-pack composition according to the present invention in a third preferred embodiment comprises the following components, each based on the total weight of components (A) to (H):
(A) 10 to 90 wt-% of the moisture-curable compound (A), wherein the moisture-curable compound comprises at least one bifunctional alkoxy silane (A1) and optionally a monofunctional alkoxy silane (A2);
(B) 0.0001 to 3 wt-%, preferably 0.001 to 1 wt-% of the at least one acid generator (B);
(C) 0.3 to 15 wt-% of the at least one carbonyl compound (C);
(D) 0 to 20 wt-% of the at least one alcohol (D) or preferably 0.1 to 20 wt-%;
(E) 0 to 20 wt-% of the at least one catalyst for silane crosslinking (E), preferably an acid catalyst;
(F) 5 to 50 wt-% of the at least one radiation-curable compound (F) based on (meth)acrylates;
(G) 0.01 to 5 wt-% of the at least one photoinitiator (G) for radical polymerization; and
(H) 0 to 70 wt-% of the at least one additive.

Preferably, the compositions according to the present invention consist of the components listed above for the respective embodiments.

Surprisingly, it has been shown that the compositions according to the present invention already exhibit rapid moisture-curing even in high layer thicknesses without an additional alcohol and/or thiol. The radiation-induced hydrolysis of the alkoxy silane groups of component (A) results in the release of the respective alcohols from the alkoxy groups, which are subsequently available for the acetalization or ketalization of the carbonyl compound (C).

Moisture-curing of the compositions according to the present invention can be additionally accelerated by adding alcohols and/or thiols as a separate component (D).

Use of the Compositions According to the Present Invention

The compositions according to the present invention can be activated by actinic radiation and cured by moisture. Unlike the state of the art, curing of the compositions according to the present invention is largely independent of the ambient moisture and the applied layer thicknesses. As opposed to the state of the art, the compositions are characterized in that the water can be efficiently released by irradiation without additional heat input. Of course, the crosslinking reaction can be further accelerated by optional heat input.

The release of an acid from component (B) by irradiation induces both water release in the compositions and crosslinking of the moisture-curable alkoxy silane groups.

Following irradiation, the compositions cure within seven days at room temperature; preferably within 24 h, and particularly preferably within 6 h, even if there is no ingress of external moisture.

The curing speed depends primarily on the equivalent ratio of all silane-bound alkoxy groups of the moisture-curable components (A) to the equivalents of the carbonyl compounds in component (C). The compositions according to the present invention are preferably formulated such that, per equivalent of silane-bound alkoxy groups in component (A), 0.01 to 3 equivalents of carbonyl groups, preferably 0.05 to 2 equivalents of carbonyl groups and particularly preferably 0.1 to 1 equivalents of carbonyl groups are present in component (C).

Preferably, the compositions are activated directly before the application or after the application on a substrate.

Activation of the composition directly before the application can be performed by irradiation of the composition in a flow activation apparatus. Suitable dosing devices for flow activation of the compositions by irradiation are described in DE 3 702 999 A and DE 10 2007 017 842 A1.

It is essential that the dwelling time of the composition following activation in a dosing device does not exceed the open time of the activated composition.

According to a preferred embodiment, a method for the bonding, molding, sealing and coating of substrates using the composition according to the present invention is provided comprising the following steps:
a) dosing the composition onto a first substrate;
b) activating the composition by irradiation with actinic radiation of a suitable wavelength during a sufficiently long period of time to release an acid from the acid generator;
c) optionally supplying a second substrate to the activated composition within an open time while forming a substrate composite;
d) maintaining a waiting time until a first strength of the composition on the substrate or in the substrate composite is achieved.

The described method can also be performed in a flow activation apparatus or a radiolucent storage vessel. In these cases, step b) is performed prior to step a). It is essential that the irradiated composition in the apparatus or the storage vessel is not left standing for too long as otherwise the composition can cure even without the ingress of moisture into the apparatus.

In the case of two or more join partners of which at least one is radiolucent, the activation step b) can also be performed after step c).

The compositions according to the present invention are particularly suitable as an adhesive or sealant for the bonding, molding, sealing and coating of any substrates.

Measuring Methods Used and Definitions

Irradiation

For irradiation, a DELOLUX 20 LED lamp from DELO Industrie Klebstoffe GmbH & Co. KG with a wavelength of 460 nm was used. The compositions were irradiated with an intensity of 200±20 mW/cm². The cartridge was irradiated from two sides for 60 seconds each.

Curing

"Crosslinking" or "curing" is defined as a polymerization, condensation or addition reaction beyond the gel point. The gel point is the point at which the storage modulus G' becomes equal to the loss modulus G". To assess the curing (solid vs. liquid), the composition activated in the cartridges is squeezed out and subjected to a haptic test with a plastic spatula. If the composition could no longer be squeezed out, the consistency of the composition was tested via the cartridge tip using a toothpick.

Room Temperature

Room temperature is defined as 23±2° C.

Viscosity

The viscosity of the compositions was measured at 23° C. using a Physica MCR302 rheometer from Anton Paar having a standardized PP20 measuring cone with a measuring gap of 200 μm, and determined at a shear rate of 10/second. For storage stability assessment, the viscosity measurement was repeated at room temperature after a 7-day storage of the compositions at room temperature with light and moisture excluded. A change in viscosity of less than 10% compared to the starting value is considered as excellent (++), of less than 25% as very good (+), of less than 50% as good (○), of less than 100% as sufficient (−) and of more than 100% as insufficient (−−).

Cartridges

Radiolucent 5 ml SEMCO cartridges from PPG Industries were used as cartridges.

Detection and Extent of Water Release

The extent of the water release was determined based on DIN 53715. To this end, a test system consisting of 15 weight parts of benzaldehyde, 36.2 parts of methanol, 0.1 parts of a photolatent acid (Irgacure PAG 103) and 48.7 parts of toluene was produced while excluding light of less than 500 nm, and the components were mixed with each other. The system was free of moisture-curable compounds. The clear, yellow solution was first subjected to a Karl-Fischer analysis without prior irradiation. Then a sample was irradiated with light of a wavelength of 400 nm (DELOLUX 80 irradiation lamp) and an intensity of 1000 mW/cm² while stirring for 4 minutes. Both immediately afterwards and then after 2 h, further Karl-Fischer analyses were performed on the irradiated sample. The water content prior to irradiation was 0.11 wt-%; directly after irradiation it was 1.46 wt-%, and after 2 h it was 1.54 wt-%.

This makes it clear that a substantial amount of water can be generated by irradiation in a system comprising a photolatent acid, a carbonyl compound and an alcohol.

Manufacturing Examples

The following components were used to produce the one-pack compositions according to the examples below:

Component (A): Moisture-Curable Compounds (A1): Bifunctional Silane Compound (A1-1) Geniosil STP-E 10 (available from Wacker Chemie AG)

(A1-2) Geniosil STP-E 15 (available from Wacker Chemie AG)

(A2): Monofunctional Silane Compound (A2-1) Geniosil XL 33 (available from Wacker Chemie AG)

(A2-2) Dynasylan VTMO (available from Evonik Industries AG)

(AS-3) Geniosil XL 63 (available from Wacker Chemie AG)

Component (B): Acid Generator (B1) Irgacure PAG 121 (available from BASF SE)

Component (C): Carbonyl Compound (C1) benzaldehyde (available from Sigma Aldrich)

(C2) acetone (available from Sigma Aldrich)

Component (D): Alcohol, Thiol (D1) methanol (available from Sigma Aldrich)

(D2) 1,3-propanediol (available from Sigma Aldrich)

Component (E): Catalyst (E1) acrylic acid (available from Sigma Aldrich)

Component (F): Radiation-Curable Compound (F1) isobornyl acrylate (IBOA; available from Sartomer)

Component (G): Radical Photoinitiator (G1) Speedcure TPO-L (available from Lambson)

Component (H): Additives (H1) Plasticizer: OXSOFT TO™ (available from Oxea)

(H2) Stabilizer: Irganox 1135 (available from BASF SE)

To produce the compositions according to the present invention, components (A) were provided while excluding light of a wavelength of less than 500 nm, and the acid generator (B) was added and dissolved at 50° C. for 15 minutes. Finally, each of the other components were added and incorporated with a dissolver. Comparative examples were produced in an analogous manner.

The composition of the compositions according to the present invention and of the comparative examples is shown in the tables below. The proportions are given in weight percent, based on the total weight of the composition made of components (A) to (H).

Formulation of the Compositions According to the Present Invention

TABLE 1

| Components | | Comparison | Examples according to the present invention | | | | | | | | | | | |
|---|---|---|---|---|---|---|---|---|---|---|---|---|---|---|
| Example | | 1[1] | 2 | 3 | 4 | 5 | 6 | 7 | 8 | 9 | 10 | 11 | 12 | 13 |
| (A) | Silane (A1-1) | 65 | 98.4 | 94.15 | 65 | 65 | 65 | 65 | 65 | 65 | 65 | 65 | 65 | — |
|  | Silane (A1-2) | — | — | — | — | — | — | — | — | — | — | — | — | 70 |
|  | Silane (A2-1) | 5 | — | — | 5 | 5 | 5 | 5 | 5 | 5 | 5 | 5 | 5 | — |
|  | Silane (A2-2) | 1.5 | 1.5 | 1.5 | 1.5 | 1.5 | 1.5 | 1.5 | 1.5 | 1.5 | 1.5 | 1.5 | 1.5 | 1.5 |
| (B) | (B1) | 0.1 | 0.1 | 0.1 | 0.1 | 0.1 | 0.1 | 0.1 | 0.1 | 0.1 | 0.1 | 0.1 | 0.1 | 0.1 |
| (C) | Aldehyde (C1) | — | — | 4.25 | 8.49 | 6.37 | 4.25 | 2.12 | 1.06 | 0.53 | — | — | — | 4.25 |
|  | Ketone (C2) | — | — | — | — | — | — | — | — | — | 3.48 | 2.32 | 1.16 | — |
| (H) | (H1) | 28 | — | — | 19.51 | 21.63 | 23.75 | 25.88 | 26.94 | 27.47 | 24.52 | 25.68 | 26.84 | 23.75 |
|  | (H2) | 0.4 | — | — | 0.4 | 0.4 | 0.4 | 0.4 | 0.4 | 0.4 | 0.4 | 0.4 | 0.4 | 0.4 |
| Properties of the compositions | | | | | | | | | | | | | | |
| Time until curing in the cartridge after irradiation (2*60 s 460 nm) at room temperature | | >7 d, liquid | >7 d, liquid | 140 min | 30 min | 50 min | 140 min | 240 min | 24 h | 7 d | 21.5 h | 45.5 h | 7 d | 24 h |
| Storage stability Change in viscosity after 7-day storage at room temperature | | ++ | ++ | ++ | ++ | ++ | ++ | ++ | ++ | ++ | ++ | ++ | ++ | ++ |

[1] see DE 10 2016 111 590 A1

TABLE 2

| Components | | Reference examples | | Comparison | Examples according to the present invention | | | | | |
|---|---|---|---|---|---|---|---|---|---|---|
| Example | | 7 | 12 | 14 | 15 | 16 | 17 | 18 | 19 | 20 |
| (A) | Silane (A1-1) | 65 | 65 | 65 | 65 | 65 | 65 | 65 | 65 | 65 |
|  | Silane (A2-1) | 5 | 5 | 5 | 5 | 5 | 5 | 5 | 5 | 5 |
|  | Silane (A2-2) | 1.5 | 1.5 | 1.5 | 1.5 | 1.5 | 1.5 | 1.5 | 1.5 | 1.5 |
| (B) | (B1) | 0.1 | 0.1 | 0.1 | 0.1 | 0.1 | 0.1 | 0.1 | 0.1 | 0.1 |
| (C) | Aldehyde (C1) | 2.12 | — | — | 2.12 | 2.12 | 2.12 | 2.12 | 2.12 | — |
|  | Ketone (C2) | — | 1.16 | — | — | — | — | — | — | 1.16 |
| (D) | (D1) | — | — | — | 0.32 | 0.96 | — | — | — | — |
|  | (D2) | — | — | 2.28 | — | — | 0.76 | 1.14 | 2.28 | 2.28 |
| (H) | (H1) | 25.88 | 26.84 | 25.72 | 25.56 | 24.92 | 25.12 | 24.74 | 23.6 | 24.56 |
|  | (H2) | 0.4 | 0.4 | 0.4 | 0.4 | 0.4 | 0.4 | 0.4 | 0.4 | 0.4 |
| Properties of the compositions | | | | | | | | | | |
| Time until curing in the cartridge after irradiation (2*60 s 460 nm) at room temperature | | 240 min | 7 d | >7 d, liquid | 180 min | 180 min | 30 min | 10 min | 20 min | 30 min |
| Storage stability Change in viscosity after 7-day storage at room temperature | | ++ | ++ | ++ | ++ | ++ | + | + | ++ | ++ |

TABLE 3

| Components | | Examples according to the present invention | | Comparison |
|---|---|---|---|---|
| Example | | 21 | 22 | 23 |
| (A) | Silane (A1-1) | 65 | 65 | 65 |
|  | Silane (A2-1) | 5 | 1 | 1 |
|  | Silane (A2-2) | 1.5 | 1.5 | 1.5 |
|  | Silane (A2-3) | — | 0.5 | 0.5 |
| (B) | (B1) | 0.1 | 0.1 | 0.1 |
| (C) | (C1) | 4.25 | 4.25 | — |
| (E) | (E1) | 3 | 3 | 3 |
| (F) | (F1) | — | 7 | 7 |
| (G) | (G1) | — | 0.6 | 0.6 |
| (H) | (H1) | 20.75 | 16.65 | 20.9 |
|  | (H2) | 0.4 | 0.4 | 0.4 |
| Properties of the compositions | | | | |
| Time until curing in the cartridge after irradiation (2*60 s 460 nm) at room temperature | | 1 h | 30 min | >7 d, liquid |
| Time until curing in the cartridge after irradiation (2*60 s 460 nm) at room temperature | | + | ○ | ++ |
| Skin formation during open storage at 23° C./50% rel. humidity without irradiation | | 16 h | 6 h | 6 h |

In Table 1, examples 3 to 9 according to the present invention contain an aldehyde as component (C). After irradiation, these formulations also cure within up to 7 days while external moisture ingress is excluded, whereas comparative examples 1 and 2 remain liquid even after seven days without external moisture ingress. The curing speed can be controlled by means of the amount of aldehyde added. As shown in examples 10 to 12, ketones also allow curing while external moisture ingress is excluded. Apart from α-silane polymers, compositions containing only γ-silane polymers as moisture-curable compounds can be used, as shown in example 13.

Table 2 shows the acceleration of curing by the addition of alcohols as component (D). While a monofunctional alcohol in the examples 15 and 16 according to the present invention shows a slight acceleration as opposed to example 7 according to the present invention, the acceleration effect caused by a bifunctional alcohol (D2) that is able to form a cyclic acetal is clearly visible in examples 17 to 20. The addition of an alcohol in the absence of a carbonyl compound (C) shows no acceleration of moisture-curing (comparative example 14).

Surprisingly, it is also possible to use a non-latent acid as component (E) in the compositions according to the present invention, as shown in example 21, without unduly deteriorating the storage stability (see Table 3). Again, curing can be achieved within 1 h after activation of the composition by irradiation while external moisture ingress is excluded. However, this composition also cures without irradiation but after the ingress of external moisture.

The composition of example 22 further contains a radiation-curable compound (F) and a photoinitiator (G). The proportion of the radiation-curable compound (F) is selected such that the composition is still liquid shortly after irradiation, and then cures within 30 min, while the composition of comparative example 23 containing no carbonyl compound as component (C) remains liquid under these conditions. Of course, those skilled in the art recognize that the proportions of the radiation-curable compounds (F) can also be selected such that the composition can be cured directly by the radical process, and moisture-curing in the already gelled material proceeds until the final strength is achieved.

The invention claimed is:

1. A moisture-curable one-pack composition that can be activated by irradiation with actinic radiation, comprising
   one or more moisture-curable compounds (A) selected from the group of alkoxy silanes;
   at least one acid generator (B) releasing an acid when exposed to actinic radiation, and
   at least one carbonyl compound and/or carbonyl derivative (C), other than a photoinitiator, wherein the carbonyl compound and/or carbonyl derivative (C) is selected from the group of aldehydes, ketones, hemiacetals or hemiketals.

2. The one-pack composition according to claim 1, wherein the one-pack composition cures without the ingress of external moisture after activation of the composition by irradiation.

3. The one-pack composition according to claim 1, wherein the alkoxy silane of component (A) comprises an at least bifunctional alkoxy silane.

4. The one-pack composition according to claim 1, further comprising at least one catalyst (E) for silane crosslinking.

5. The one-pack composition according to claim 1, further comprising at least one radiation-curable compound (F) and at least one radical photoinitiator (G).

6. The one-pack composition according to claim 1, further comprising at least one compound from the group of alcohols and/or thiols.

7. The one-pack composition according to claim 1, comprising:
   (A) at least one moisture-curable compound in a proportion of 10 to 99 wt-%, wherein the moisture-curable compound comprises at least one bifunctional alkoxy silane (A1) and optionally a monofunctional alkoxy silane (A2);
   (B) at least one acid generator in a proportion of 0.0001 to 3 wt-%;
   (C) at least one carbonyl compound and/or carbonyl derivative in a proportion of 0.3 to 15 wt-%;
   (D) at least one compound from the group of alcohols and/or thiols in a proportion of 0 to 30 wt-%;
   (E) at least one catalyst for silane crosslinking in a proportion of 0 to 20 wt-%;
   (F) at least one radiation-curable compound in a proportion of 0 to 50 wt %;
   (G) at least one radical photoinitiator in a proportion of 0 to 5 wt-%; and
   (H) at least one additive (H) in a proportion of 0 to 70 wt-%;
   each based on a total weight of components (A) through (H).

8. The one-pack composition according to claim 7, wherein the composition comprises components (A), (B), (C) and optionally at least one of components (D) and (H).

9. The one-pack composition according to claim 7, wherein the one-pack composition contains the at least one radiation-curable compound (F) in a proportion of 5 to 50 wt-% and the radical photoinitiator (G) in a proportion of 0.01 to 5 wt-%.

10. The one-pack composition according to claim 1, wherein the composition, after activation by irradiation, cures in less than 7 days.

11. The one-pack composition according to claim 1, wherein a viscosity of the one-pack composition changes by less than 100% after a 7-day storage at room temperature.

12. The one-pack composition according to claim 1 configured for use as an adhesive or sealant for bonding, casting, molding, sealing and coating of substrates.

13. A method for bonding, molding, sealing and coating of substrates using the one-pack composition according to claim 1, the method comprising:
   a) dosing the one-pack composition onto a first substrate;
   b) activating the composition by irradiation with actinic radiation of a suitable wavelength during a sufficiently long period of time to release an acid from the acid generator (B);
   c) optionally supplying a second substrate to the activated one-pack composition within an open time while forming a substrate composite; and
   d) maintaining a waiting time until a first strength of the composition on the substrate or in the substrate composite is achieved.

14. The method according to claim 13, wherein activation of the one-pack composition is performed in a flow apparatus.

15. The one-pack composition according to claim 3, wherein the alkoxy silane of component (A) comprises an at least bifunctional α-alkoxy silane.

16. The one-pack composition according to claim 1, wherein the at least one catalyst (E) for silane crosslinking is an acid catalyst.

17. The one-pack composition according to claim 6, wherein the one-pack composition comprises at least one compound from the group of aliphatic alcohols and/or aliphatic thiols, more preferably a dialcohol and/or a dithiol, particularly preferably 1,2-dialcohols, 1,3-dialcohols, 1,2-dithiols or 1,3-dithiols, and mixtures thereof.

18. The one-pack composition according to claim 17, wherein the aliphatic alcohols and/or aliphatic thiols are selected from the group consisting of a dialcohol and/or a dithiol.

19. The one-pack composition according to claim 18, wherein the dialcohol and/or dithiol is selected from the group consisting of 1,2-dialcohols, 1,3-dialcohols, 1,2-dithiols and 1,3-dithiols, and mixtures thereof.

20. The one-pack composition according to claim 7, wherein:
   the at least one acid generator is present in a proportion of 0.001 to 1 wt-%;
   the at least one compound from the group of alcohols and/or thiols is present in a proportion of 0.1 to 20 wt-%;
   the at least one catalyst for silane crosslinking is present in the form of an acid catalyst, in a proportion 0.1 to 5 wt-%;
   the at least one radiation-curable compound is present in a proportion of 5 to 50 wt-%;
   the at least one radical photoinitiator is present in a proportion of 0.01 to 5 wt-%; and
   the at least one additive (H) is selected from the group of fillers, colorants, pigments, photosensitizers, anti-ageing agents, fluorescent agents, stabilizers, moisture scavengers, accelerators, adhesion promoters, crosslinking agents, flow improvers, wetting agents, thixotropic agents, diluents, flexibilizers, polymeric thickeners, flame retardants, corrosion inhibitors, plasticizers and tackifiers, alone or in combination with each other.

21. The one-pack composition according to claim 10, wherein the composition, after activation by irradiation, cures within 24 h and particularly preferably within at most 6 h.

22. The one-pack composition according to claim 21, wherein the composition, after activation by irradiation, cures within at most 6 h.

* * * * *